C. G. BAUER.
CONDUIT KNITTING MACHINE.
APPLICATION FILED FEB. 17, 1917.
1,260,954.
Patented Mar. 26, 1918.
5 SHEETS—SHEET 4.
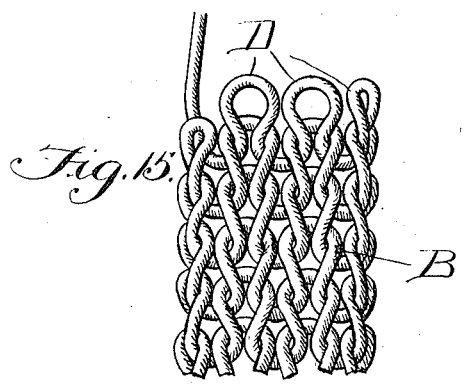
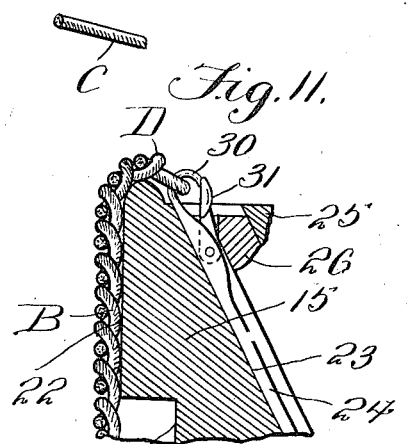
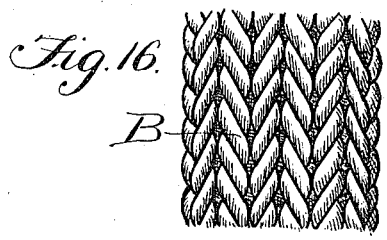
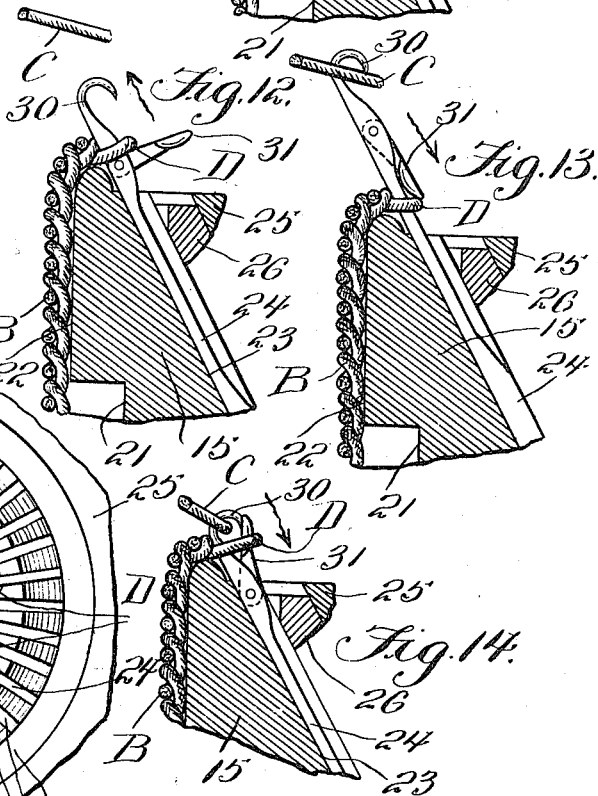
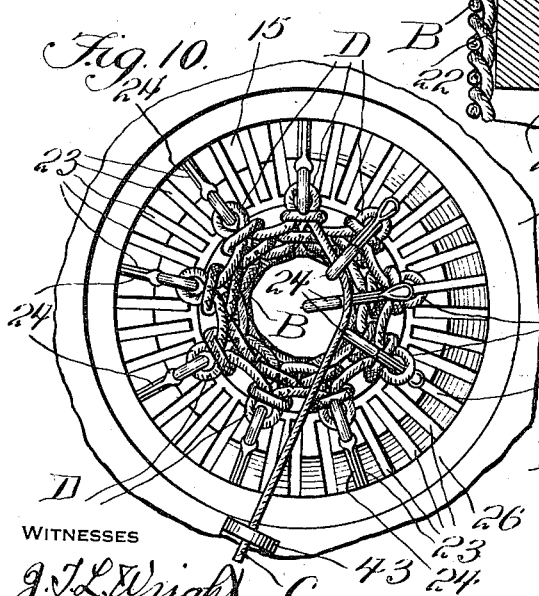
INVENTOR
C. G. Bauer
BY Victor J. Evans
ATTORNEY
WITNESSES

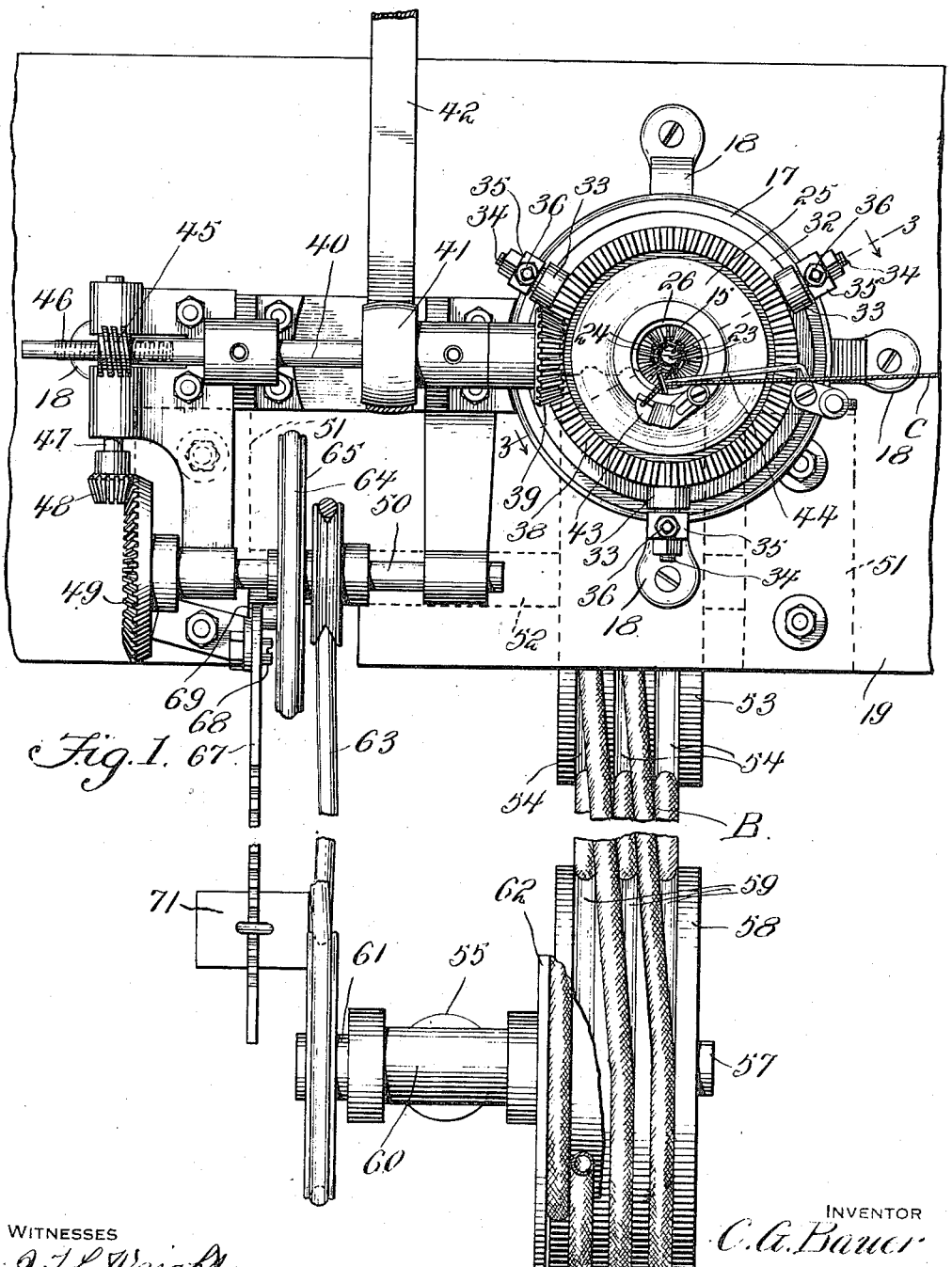

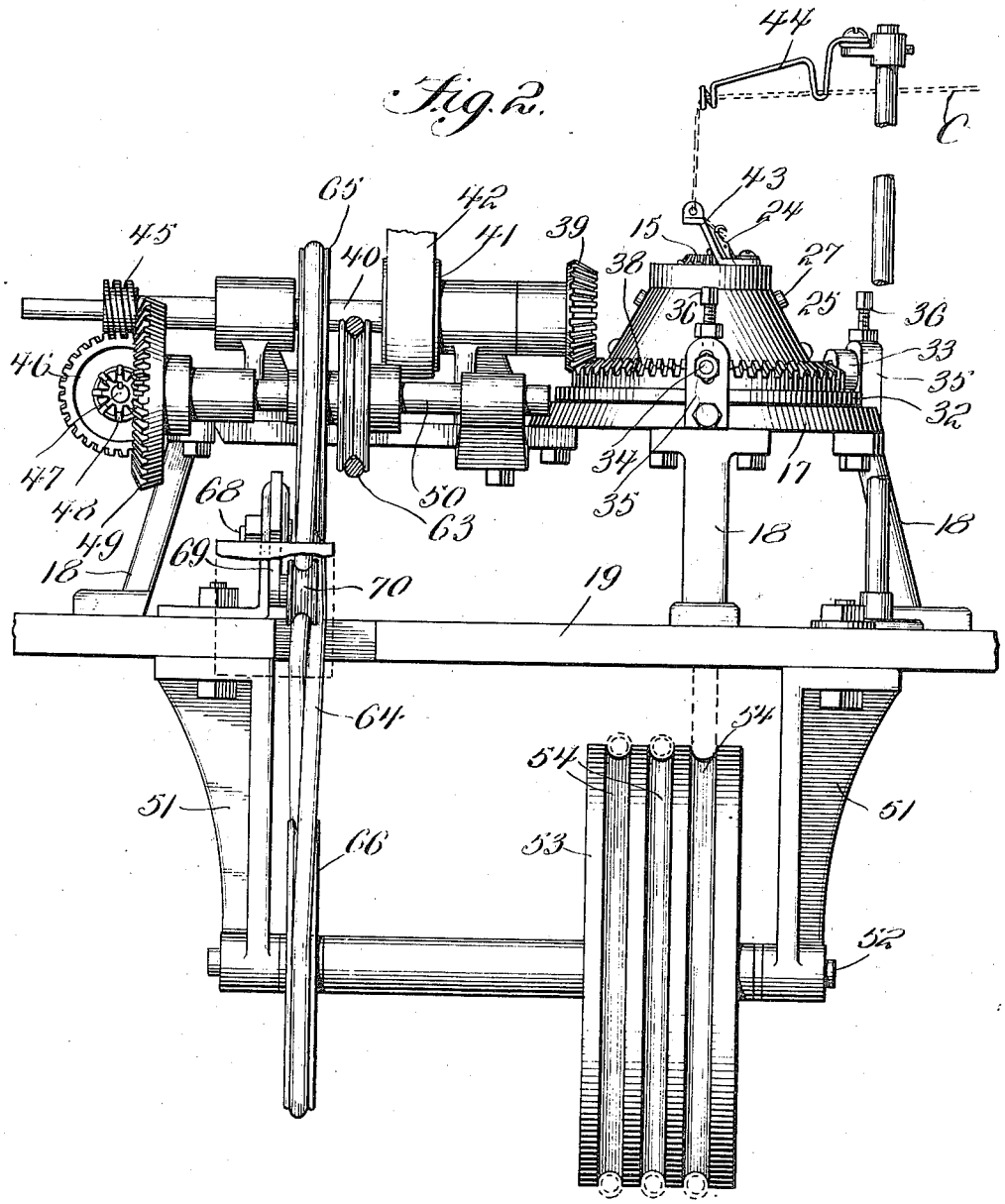

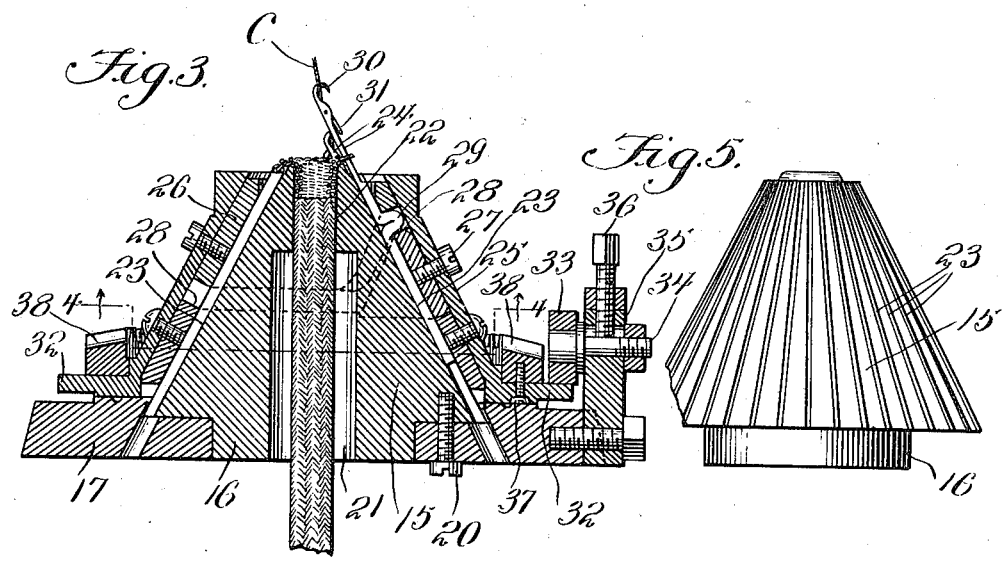
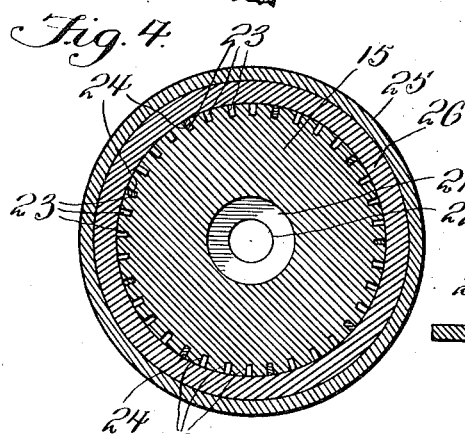
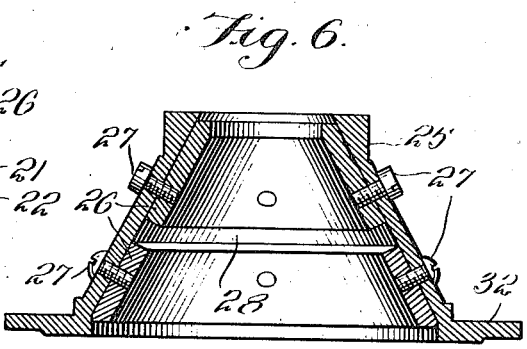
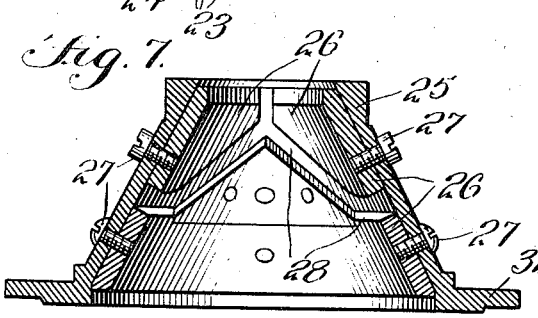

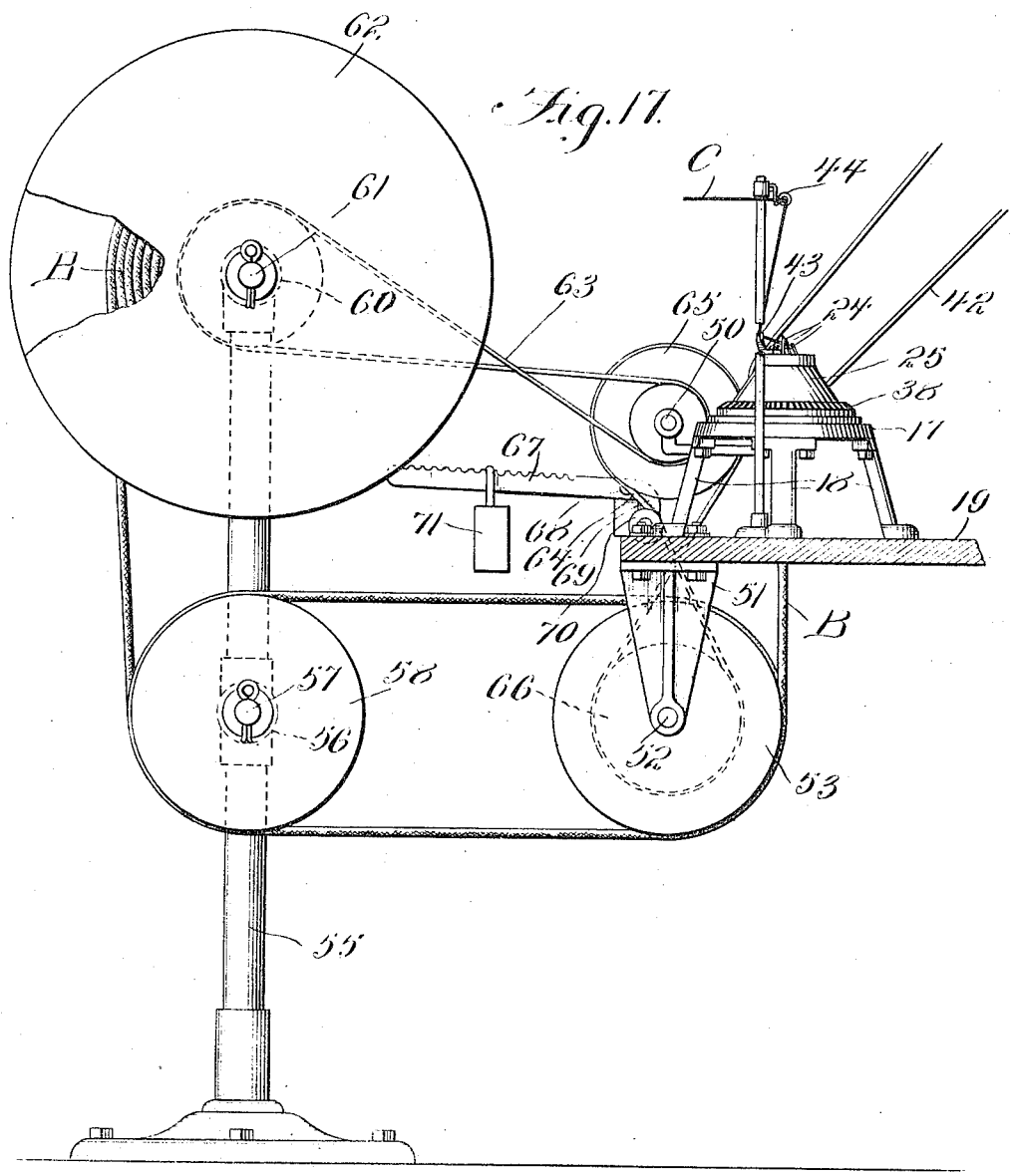

UNITED STATES PATENT OFFICE.

CHARLES G. BAUER, OF BROOKLYN, NEW YORK, ASSIGNOR TO TRIANGLE CONDUIT COMPANY, INC., OF BROOKLYN, NEW YORK, A CORPORATION OF NEW YORK.

CONDUIT-KNITTING MACHINE.

1,260,954.   Specification of Letters Patent.   Patented Mar. 26, 1918.

Application filed February 17, 1917. Serial No. 149,252.

*To all whom it may concern:*

Be it known that I, CHARLES G. BAUER, a citizen of the United States, residing at Brooklyn, in the county of Kings and State of New York, have invented new and useful Improvements in Conduit-Knitting Machines, of which the following is a specification.

This invention relates to machines of the type generally known as knitting machines and it has particular reference to a machine for knitting tubular fabric of a kind which is specially utilized in the manufacture of electrical conduits.

Such conduits have heretofore been made of knitted or woven tubular textile fabric, the same being treated with a filling of non-combustible material which will render it fire-proof without interfering materially with the flexible qualities of the fabric. Such tubular textile fabrics as have heretofore been employed have, however, been usually woven or manufactured in such a manner as to present little body to receive the filling, the result being that in subsequently bending the conduit fabric it has been extremely liable to kink, thereby seriously interfering with its usefulness.

The primary object of the present invention is to produce a machine for knitting a tubular fabric adapted to be used for the purpose described, said fabric being formed of a single yarn which may be of as heavy body as necessary to produce the best results.

A further object of the invention is to produce a machine which, by simply varying the number of needles, may be utilized to produce tubular fabrics of various diameters, this being accomplished by varying the number of loops in each round of the tubular fabric, and the number of loops being obviously governed by the number of needles employed.

A further object of the invention is to produce means whereby, by varying the tension on the fabric as it leaves the machine, the knitting of the fabric may be tightened or loosened at will, by tightening or loosening the individual loops of which the fabric is composed, thereby producing fabric adapted to absorb a greater or a lesser quantity of impregnating material as may be desired according to the use subsequently to be made of the finished product.

A further object of the invention is to simplify and improve the tensioning device whereby the tightness of the knitting is governed.

With these and other ends in view which will readily appear as the nature of the invention is better understood, the same consists in the improved construction and novel arrangement and combination of parts which will be hereinafter fully described and particularly pointed out in the claim.

In the accompanying drawings has been illustrated a simple and preferred form of the invention, it being, however, understood that no limitation is necessarily made to the precise structural details therein exhibited, but that changes, alterations and modifications within the scope of the claim may be resorted to when desired.

In the drawings,

Figure 1 is a top plan view of a machine constructed in accordance with the invention.

Fig. 2 is a front elevation of the same.

Fig. 3 is a sectional detail view taken on the line 3—3 in Fig. 1.

Fig. 4 is a sectional detail view taken on the line 4—4 in Fig. 3.

Fig. 5 is a detail view in side elevation of the conical core having grooves wherein the needles are guided.

Fig. 6 is a vertical sectional view showing one side of the external housing and the cam cylinder mounted therein.

Fig. 7 is a vertical sectional view showing the other side of the housing and cam cylinder.

Figs. 8 and 9 are detail views of one of the needles.

Fig. 10 is a top plan view of the apex of the knitting machine illustrating the formation of the tubular fabric.

Figs. 11, 12, 13 and 14 are sectional views illustrating various steps in the formation of a loop.

Fig. 15 is a diagrammatic view in side elevation of the finished fabric, the loops being shown in loose condition so as to illustrate the formation thereof.

Fig. 16 is a side elevation of the finished fabric, the loops being drawn sufficiently tight to illustrate the true appearance of the finished fabric.

Fig. 17 is a diagrammatic view in side elevation of the improved machine.

The core 15 of the improved machine is of approximately conical shape, said core being provided with a reduced base portion 16 which is fitted in a base ring 17, the latter being mounted on suitable supports indicated at 18, said supports rising from a bench or table 19. The core is secured in position by fastening means such as screws one of which may be seen at 20 in Fig. 3.

The core has an axial bore 21 the upper end portion of which is reduced as seen at 22, and the core is provided with external grooves 23 in which the needles 24 are guided. The grooves 23, each of which is located in the vertical plane of the axis of the core, obviously converge in the direction of the apex of the core. It is here desired to state that while the number of needle grooves may be varied, it is preferred to use thirty-six such grooves as will be seen in Fig. 4. The number 36 being divisible by 2, 3, 4, 6, 9, 12 and 18 would enable any of these numbers of needles to be equidistantly disposed in grooves of the core; eliminating the lesser numbers, such as 2, 3 and 4, which might not be profitably used, the core would still be adapted to receive either 6, 9 or 12 equidistantly disposed needles, enabling fabrics of three different diameters to be made by simply changing and properly arranging the needles. In a core having forty needle grooves, 5, 8 or 10 needles might be used. In a core having thirty-two grooves, 8 or 16 needles might be used. It is thought, however, as above stated, that a core having thirty-six grooves will meet all reasonable requirements.

The core 15 is surrounded by a conical housing 25 on the inner face of which the sections 26 of the cam cylinder are secured in the customary manner by fastening devices such as screws 27. The sections 26 combine to form the cam groove 28 that engages the nibs or projections 29 of the needles which will thereby be reciprocated in their respective grooves when the machine is in operation. Each needle is formed with a hook 30 at the upper end thereof, each needle being also provided with a latch 31 that operates in the customary well known manner.

The conical housing 25 is provided at the lower end thereof with an annular flange 32 that rests and is rotatably supported on the base member 17. The top face of the flange 32 is engaged by anti-friction rollers 33 each of which is carried by a stem or shaft 34 that is secured in a standard or upright 35 by means of a set screw 36 whereby the tension of the anti-friction member against the flange 32 may be regulated. Fixed on the flange 32 by means of screws 37 is an annular bevel gear 38 which receives motion from a bevel pinion 39 carried by a shaft 40 which has been shown as being equipped with a band pulley 41 that receives motion through the medium of a belt or band 42 from any convenient source of power.

The housing member 25 to which rotary motion will thus be imparted when the machine is in operation, carries the yarn guide 43 to which the yarn is fed from a stationary guide 44 from a suitable source of supply.

The driven shaft 40 carries a worm 45 meshing with a worm gear 46 on a shaft 47, said shaft carrying at one end a bevel pinion 48 meshing with a bevel gear 49 on a countershaft 50 which is supported for rotation in parallel relation to the driven shaft 40.

Supported for rotation in hangers or brackets 51 beneath the bench or table 19 is a shaft 52 carrying a drum 53 having a plurality of circumferential grooves 54. An upright 55 arranged in front of the bench or table 19 supports a bearing member 56 wherein is journaled a shaft 57 on which a drum 58, similar to the drum 53 and having a plurality of circumferential grooves 59, is loosely supported for rotation independently of said shaft. The upright or column 55 supports an additional bearing 60 wherein is journaled a shaft 61 carrying a winding drum or reel 62 whereon the tubular fabric produced by the machine is ultimately wound, said shaft 61 receiving motion from the countershaft 50 through the medium of a crossed belt or band 63. The countershaft 50 is connected with the shaft 52 by means of a crossed belt 64 which is trained over pulleys 65 and 66 on the respective shafts, said belt 64 being purposely adjusted so as to loosely engage the respective pulleys. For the purpose of varying and increasing the tension of the belt 64 a tightener or tension device is provided, the same comprising a lever 67 fulcrumed at 68 adjacent to the pulley 65, said lever having an arm 69 carrying a tightening pulley 70 which is held in engagement with the belt or band 65 with the requisite degree of tension by a weight 71 adjustably supported on the lever 67.

The tubular fabric B, as it leaves the knitting machine, is guided successively in the grooves 54 and 59 of the drums 53 and 58, and is eventually guided to the winding reel 62 where it is wound, said reel being rotated by the transmission means provided for the purpose. The drums 53 and 58 over which the fabric is trained will to some extent resist the winding of the fabric, the degree of resistance being governed by the degree of tension exerted by the weight 71 on the belt or band 64, it being obvious that when said belt or band is relatively taut, the tension is relatively increased.

The manner of forming the tubular fabric from a single yarn, and the appearance of said fabric when finished, will be readily understood by reference to Figs. 10 to 16, inclusive. The yarn C which is guided through the guide 43 supported on the rotary housing 25 will be successively presented to the needles that are at the upper limit of their movement, the yarn being caught by the hook of the needle and pulled down through a loop D formed by the previous operation of the same needle, the general operation of the needle and its pivoted latch being well known, and the same resulting in the production of the tubular fabric illustrated in Figs. 15 and 16, the former figure showing diagrammatically the exact formation of the interengaging loops. When a strong pull or tension is exerted on the tubular fabric as it leaves the core of the machine, such tension will be communicated to the yarn from which the loops entering in the formation of the fabric are formed, and the loops will thus be relatively loose, producing a comparatively full and bulky fabric. Low tension on the fabric will result in the production of more tightly formed loops and a comparatively tighter and less bulky fabric will thus be formed.

It will be readily understood that the number of loops in each round of the fabric will be determined by the number of needles employed, and it is also obvious that by varying the number of loops, the diameter of the finished product may be varied. In the example illustrated in the drawings nine needles have been shown. It will be readily understood, however, that by temporarily removing the housing and the cam cylinder a different number of needles might be placed in the grooves of the core, thus resulting in the production of a tubular fabric of larger or smaller diameter as might be desired. Always, however, it is considered essential that the number of needle grooves in the core be a multiple of the number of needles employed because said needles must be disposed equidistantly around the circumference of the core.

From the foregoing description, taken in connection with the drawings hereto annexed, it will be seen that a very simple and efficient machine has been produced which is capable of being run at high speed for the purpose of manufacturing a textile tubular fabric having the qualifications named at the outset of this specification. The general construction is simple and inexpensive, and the machine is one which is not liable to get out of order when run at high speed.

Having thus described the invention, what is claimed as new is:

In a machine of the class described, a base ring, a core having a reduced portion engaging said base ring, means for securing the core upon the base ring, and needles guided on the core, a housing having an annular flange supported on the base ring, cam sections carried by the housing, an annular bevel gear supported on the flange and secured thereon, uprights carried by the base ring, anti-friction members carried by the uprights and engaging the flange of the housing, means for varying the tension of the anti-friction members with respect to the housing, and means for driving the housing, in combination with a yarn guide carried by the housing, and means for feeding the yard to said guide from a source of supply.

In testimony whereof I affix my signature.

CHARLES G. BAUER.